US006574881B2

(12) United States Patent
Cole, III

(10) Patent No.: US 6,574,881 B2
(45) Date of Patent: Jun. 10, 2003

(54) TAPE MEASURE AND MARKING APPARATUS

(76) Inventor: Robert E. Cole, III, 3200 81st St. North, St. Petersburg, FL (US) 33710

( * ) Notice: Subject to any disclaimer, the term of this patent is extended or adjusted under 35 U.S.C. 154(b) by 0 days.

(21) Appl. No.: 09/837,082

(22) Filed: Apr. 18, 2001

(65) Prior Publication Data

US 2001/0034953 A1 Nov. 1, 2001

Related U.S. Application Data

(60) Provisional application No. 60/205,004, filed on May 17, 2000.

(51) Int. Cl.$^7$ .............................. G01B 3/10; B43L 9/04
(52) U.S. Cl. .......................... 33/668; 33/768; 33/27.032
(58) Field of Search .......................... 33/668, 755, 759, 33/760, 770, 768, 27.032

(56) References Cited

U.S. PATENT DOCUMENTS

| | | | |
|---|---|---|---|
| 3,336,678 A | | 8/1967 | Chamberlain et al. |
| 3,802,083 A | | 4/1974 | Freed |
| 4,580,347 A | * | 4/1986 | McKnight .................... 224/669 |
| 4,630,376 A | * | 12/1986 | Pentecost ..................... 33/668 |
| 4,667,412 A | | 5/1987 | Carlson |
| 4,760,648 A | * | 8/1988 | Doak et al. .................... 33/668 |
| 4,914,830 A | * | 4/1990 | Legare ....................... 33/27.03 |
| 4,964,225 A | * | 10/1990 | Waldherr ...................... 33/668 |
| 4,965,941 A | | 10/1990 | Agostinacci |
| 5,172,486 A | * | 12/1992 | Waldherr .................... 33/27.03 |
| 5,435,074 A | | 7/1995 | Holevas et al. |
| 5,671,543 A | * | 9/1997 | Sears .......................... 33/668 |
| 5,829,152 A | | 11/1998 | Potter et al. |
| 6,041,513 A | | 3/2000 | Doak |
| 6,223,443 B1 | * | 5/2001 | Jacobs ....................... 33/27.03 |

* cited by examiner

*Primary Examiner*—Diego Gutierrez
*Assistant Examiner*—Tania C. Courson

(57) ABSTRACT

A marking apparatus is provided for use with a tape measure. The marking apparatus includes a marker support member attached to a first outer side of a tape measure housing, and the marker support member extends forward of the tape measure housing in the tape dispensing direction. A retractable marker unit is attached to the marker support member at a location distal to the tape measure housing. The retractable marker unit is located beside the measuring tape that is dispensed from the tape measure housing. The retractable marker unit includes a marker element for marking an article, based upon a particular indicia that is selected from tape measure indicia. A pointer member, for pointing to the selected indicia, is attached to the retractable marker unit and extends over a portion of the dispensed measuring tape. A magnifier unit can also be employed with the retractable marker unit. The retractable marker unit optionally may be operated to select a desired form of emplaced enhanced marking.

11 Claims, 7 Drawing Sheets

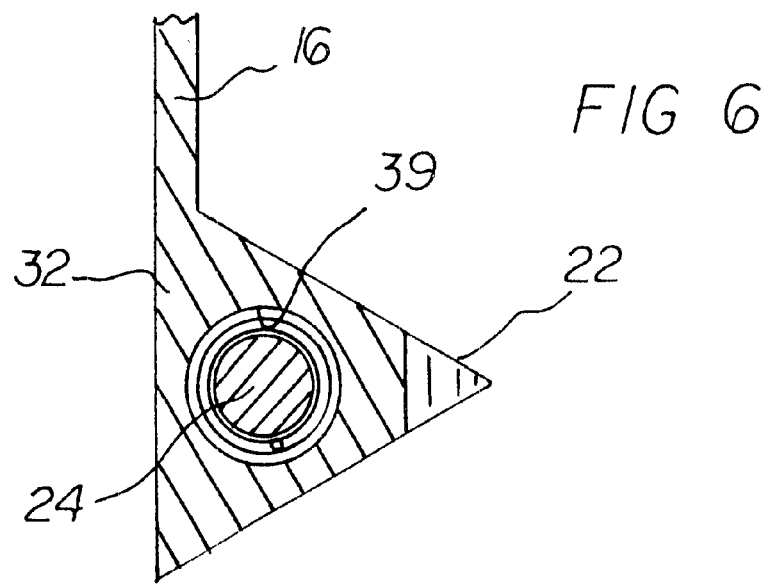
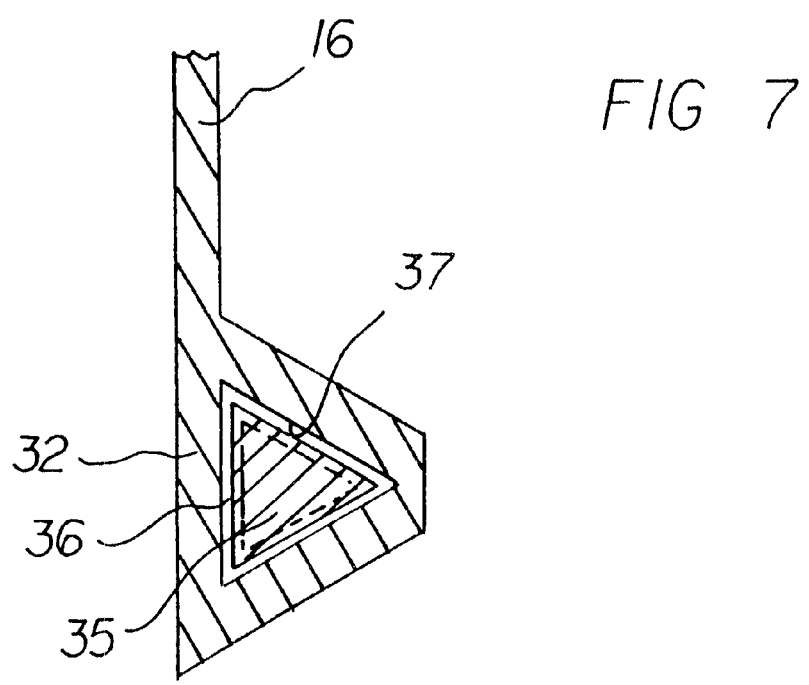

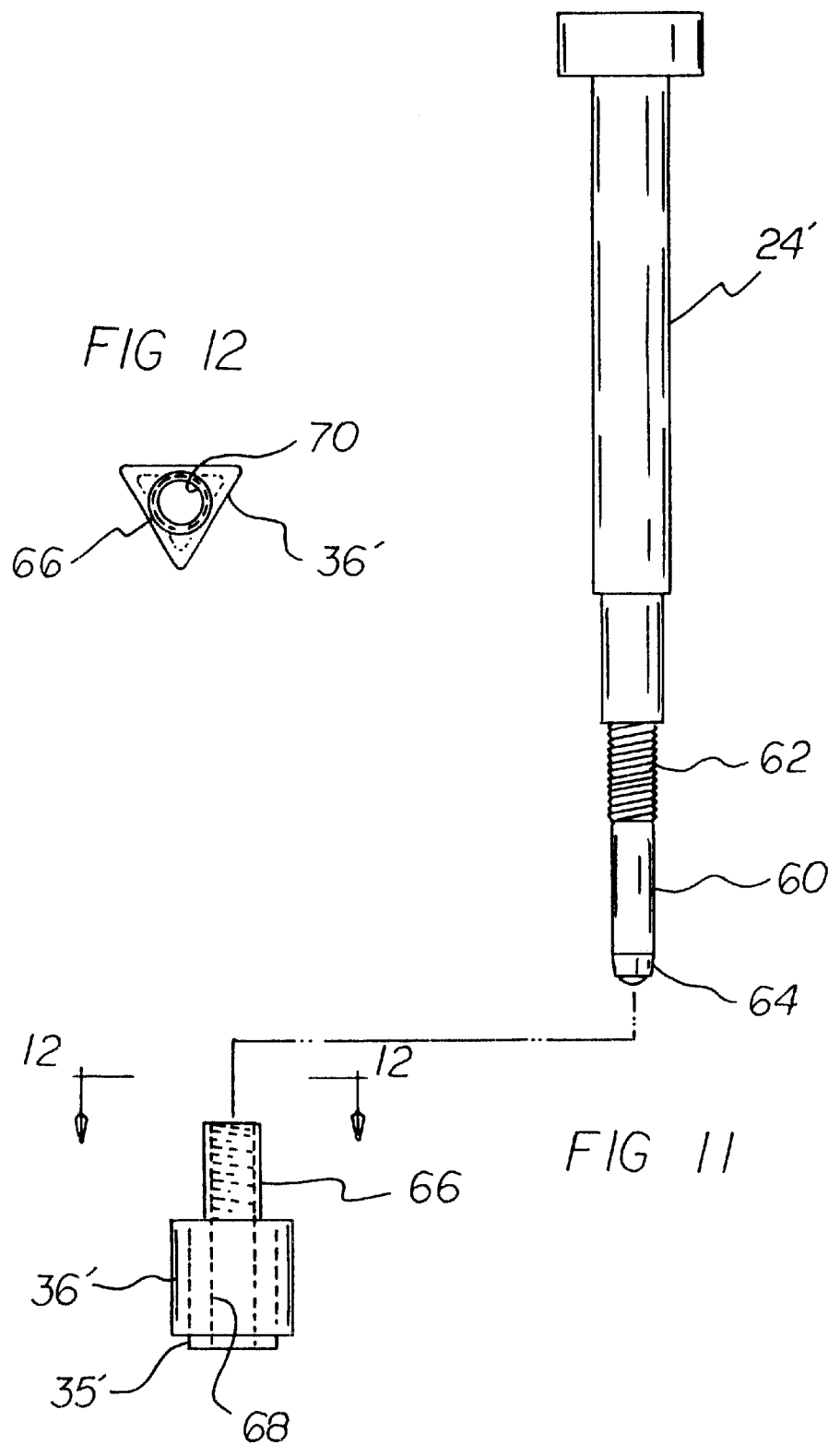

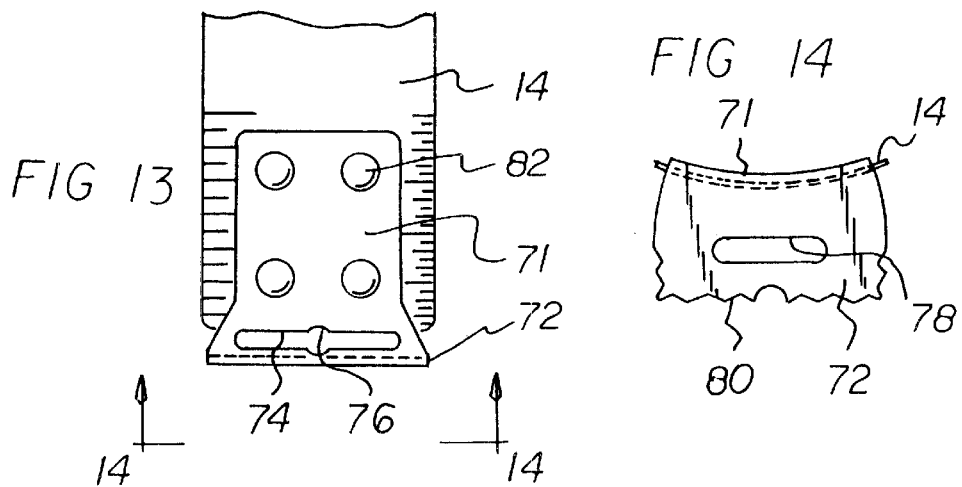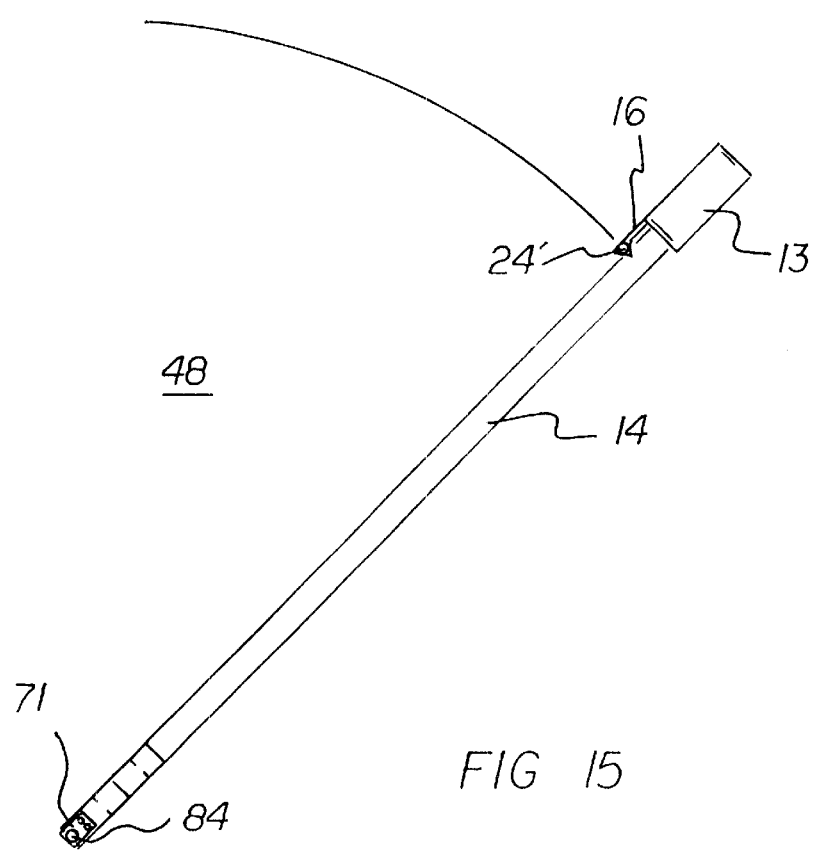

TAPE MEASURE AND MARKING APPARATUS

CROSS-REFERENCE TO RELATED APPLICATION

This application claims priority based upon my Provisional Application Serial No. 60/205,004, filed May 17, 2000.

BACKGROUND OF THE INVENTION

1. Field of the Invention

The present invention relates generally to tape measures and, more particularly, to tape measures that are especially adapted for marking an article that is being measured.

2. Description of the Prior Art

It is well known in the art to use a tape measure and to apply a mark to an article that is being measured. In this respect, throughout the years, a number of innovations have been developed relating to tape measures that are equipped with marking instruments, and the following U.S. patents are representative of some of those innovations: U.S. Pat. Nos. 3,336,678, 3,802,083, 4,667,412, 4,965,941, 5,435,074, 5,829,152, and 6,041,513. More specifically, each of U.S. Pat. Nos. 3,336,678, 3,802,083, 4,965,941, 5,435,074, and 6,041,513 discloses a tape measure that is equipped with a marking instrument that makes a mark, in the form of a point, on an article being measured. Although a mark in the form of a point may be suitable for some purposes, a more expansive mark would be more easily visible in many instances. In this respect, it would be desirable if a tape measure and marking apparatus were provided which makes a mark that is more expansive than a point.

Each of U.S. Pat. Nos. 4,667,412 and 5,829,152 discloses a tape measure and marking apparatus that provides a linear mark under a portion of the tape measure. Although providing a mark under a tape measure may be suitable in some instances, there are other instances in which it would be desirable to provide a mark, more expansive than a point, to the side of the tape. In this respect, it would be desirable if a tape measure and marking apparatus were provided which places a mark to the side of the tape, wherein the mark is more expansive than a point.

Still other features would be desirable in a tape measure and marking apparatus. For example, it is important to closely match a mark that is made with a tape measure measurement. To facilitate making this close match between the mark that is made and the measurement on the tape measure, it would be desirable if a tape measure and marking apparatus were provided with a pointer that points from a marker portion of the apparatus to a tape measure portion of the apparatus.

In addition, for accurate marking of an article, it is important that all of the following be in clear alignment: the pointer; the position on the tape measure that is pointed to; and the mark that is made on the article.

Still further, for optimum accuracy in marking an article, and in matching the mark on the article to indicia on the tape measure, it would be desirable if a tape measure and marking apparatus were provided that makes a mark wherein the mark itself points to aligned indicia on a tape measure.

Once a desired mark is made on an article by a marker, it is important that the marker not make any extraneous or unwanted marks on the article. To help prevent the making of unwanted marks, it would be desirable if a tape measure and marking apparatus were provided which has a retractable marking element that automatically retracts once a desired mark has been made on an article.

A large number of conventional tape measures are already out in the marketplace that do not have any marking system associated therewith. To improve the functionality of conventional tape measures that do not have marking systems, it would be desirable if a marking system could be retrofitted to a conventional tape measure to provide a combination tape measure and marking apparatus.

For persons who have difficulty in reading a tape measure and in aligning a pointer with indicia on the tape measure because of insufficient visual acuity, it would be desirable if a tape measure and marking apparatus were provided with a magnifier which provides magnification of the pointer and indicia on the tape measure.

With some tape measure and marking apparatuses, a mark is made on an article by moving a portion of a pointed marker along the article to be marked. The act of moving a marker along an article that is marked may lead to inaccuracies caused by slippage. To avoid such slippage caused by a marker that moves along an article that is marked, it would be desirable if a marker were provided which simply stamps a mark upon an article to be marked.

Thus, while the foregoing body of prior art indicates it to be well known to use combination tape measures and marking apparatuses, the prior art described above does not teach or suggest a tape measure and marking apparatus which has the following combination of desirable features: (1) makes a mark that is more expansive than a point; (2) places a mark to the side of the tape, wherein the mark is more expansive than a point; (3) provides a pointer that points from a marker portion of the apparatus to a tape measure portion of the apparatus; (4) provides all of the following be in clear alignment—a pointer; a position on the tape measure that is pointed to; and a mark that is made on the article; (5) makes a mark wherein the mark itself points to aligned indicia on a tape measure; (6) has a retractable marking element that automatically retracts once a desired mark has been made on an article; (7) can be retrofitted to a conventional tape measure to provide a combination tape measure and marking apparatus; (8) can be provided with a magnifier which provides magnification of a pointer and indicia on the tape measure; and (9) stamps a mark upon an article to be marked; (10) provides a selectable option of type of enhanced marking to be used and the corresponding manner of operation thereof; and (11) which optionally facilitates the marking of scribed arcs by permitting the anchoring of the end of the measuring tape on a work surface such that the tape measure housing may be moved simultaneously upon actuation of the marking apparatus thereof.

The foregoing desired characteristics are provided by the unique tape measure and marking apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a marking apparatus for use with a tape measure that has a tape measure housing from which measuring tape exits in a tape dispensing direction. The marking apparatus includes a marker support member attached to a first outer side of the tape measure housing, and the marker support member extends forward of the tape measure housing in the tape dispensing direction. A retractable marker unit is attached to the marker support member at a location distal to the tape measure housing in the tape dispensing direction. The retractable marker unit is located beside the measuring tape that is dispensed from the tape measure housing. A belt clip can be attached to a second outer side of the tape measure housing. A pointer member is attached to the retractable marker unit and extends over a portion of the measuring tape that is dispensed from the tape measure housing.

More specifically, the retractable marker unit includes a vertically extending plunger which includes an alignment indicia which is in alignment with the pointer member. The alignment indicia is in a form of an alignment triangle which has a triangle apex pointing in alignment with the pointer member. The retractable marker unit includes a marker unit housing which receives the plunger. A return spring is received in the marker unit housing and urges the plunger towards a non-marking position. A marker element retainer is attached to a distal end of the plunger, and a marker element is attached to the marker element retainer. Preferably, the marker element is an absorbent pad that contains a quantity of marking liquid, such as ink.

Preferably, the marker unit housing has a generally trapezoidal cross-sectional shape whose non-parallel sides tend to converge towards the pointer member. The marker element is in a form of a marker triangle which has a triangle apex pointing in alignment with the pointer member and the alignment triangle. Preferably, the marker element is in a form of an ink pad.

With another embodiment of the invention, an adhesive surface is formed on a tape-measure-facing side of the marker support member. A release sheet is provided for covering the adhesive surface prior to adhering the adhesive surface to the first outer side of the tape measure housing. Using this embodiment of the invention, a conventional tape measure can be retrofitted with the marking apparatus of the invention.

With another embodiment of the invention, a magnifier unit is attached to the retractable marker unit and extends transversely across the tape measure that is dispensed from the tape measure housing. The magnifier unit is attached to the retractable marker unit with a spring clip portion at a location above the pointer member.

With yet another embodiment of the invention, a tape measure and marking apparatus is provided which provides a selectable option of type of enhanced marking to be used and the corresponding manner of operation thereof.

With still yet another embodiment of the invention, a tape measure and marking apparatus is provided having a unique end tab which facilitates the marking of scribed arcs by permitting the anchoring of the end of the measuring tape on a work surface such that the tape measure housing may be moved simultaneously upon actuation of the marking apparatus thereof.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tape measure and marking apparatus which has all of the advantages of the prior art and none of the disadvantages.

It is another object of the present invention to provide a new and improved tape measure and marking apparatus which may be easily and efficiently manufactured and marketed.

It is a further object of the present invention to provide a new and improved tape measure and marking apparatus which is of durable and reliable construction.

An even further object of the present invention is to provide a new and improved tape measure and marking apparatus which is susceptible of a low cost of manufacture with regard to both materials and labor, and which accordingly is then susceptible of low prices of sale to the consuming public, thereby making such tape measure and marking apparatus available to the buying public.

Still yet a further object of the present invention is to provide a new and improved tape measure and marking apparatus which makes a mark that is more expansive than a point.

Still another object of the present invention is to provide a new and improved tape measure and marking apparatus that places a mark to the side of the tape, wherein the mark is more expansive than a point.

Yet another object of the present invention is to provide a new and improved tape measure and marking apparatus which provides a pointer that points from a marker portion of the apparatus to a tape measure portion of the apparatus.

Even another object of the present invention is to provide a new and improved tape measure and marking apparatus that provides all of the following be in clear alignment—a pointer.

Still a further object of the present invention is to provide a new and improved tape measure and marking apparatus which makes a mark wherein the mark itself points to aligned indicia on a tape measure.

Yet another object of the present invention is to provide a new and improved tape measure and marking apparatus that has a retractable marking element that automatically retracts once a desired mark has been made on an article.

Still another object of the present invention is to provide a new and improved tape measure and marking apparatus which can be retrofitted to a conventional tape measure to provide a combination tape measure and marking apparatus.

Yet another object of the present invention is to provide a new and improved tape measure and marking apparatus that can be provided with a magnifier which provides magnification of a pointer and indicia on the tape measure.

Still a further object of the present invention is to provide a new and improved tape measure and marking apparatus that stamps a mark upon an article to be marked.

Yet still a further object of the present invention is to provide a new and improved tape measure and marking apparatus that provides a selectable option of type of enhanced marking to be used and the corresponding manner of operation thereof.

Still another object of the present invention is to provide a new and improved tape measure and marking apparatus that optionally facilitates the marking of scribed arcs by permitting the anchoring of the end of the measuring tape on a work surface such that the tape measure housing may be moved simultaneously upon actuation of the marking apparatus thereof.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 6 is a cross-sectional view of the embodiment of the invention of FIG. 5 taken along line 6—6 thereof.

FIG. 7 is a cross-sectional view of the embodiment of the invention of FIG. 5 taken along line 7—7 thereof.

FIG. 11 is an exploded assembly of an alternative form of plunger and marker element retainer according to the present invention.

FIG. 12 is a plan view taken along line 12—12 of FIG. 11.

FIG. 13 is an enlarged partial top view of the preferred measuring tape end tab employed with the present invention.

FIG. 14 is an elevational view of the preferred measuring tape end tab employed with the present invention taken along line 14—14 of FIG. 13.

FIG. 15 is a schematic plan view illustrating how the present invention may be employed advantageously to scribe arcs on a work surface.

DESCRIPTION OF THE PREFERRED EMBODIMENT

Figure 1:
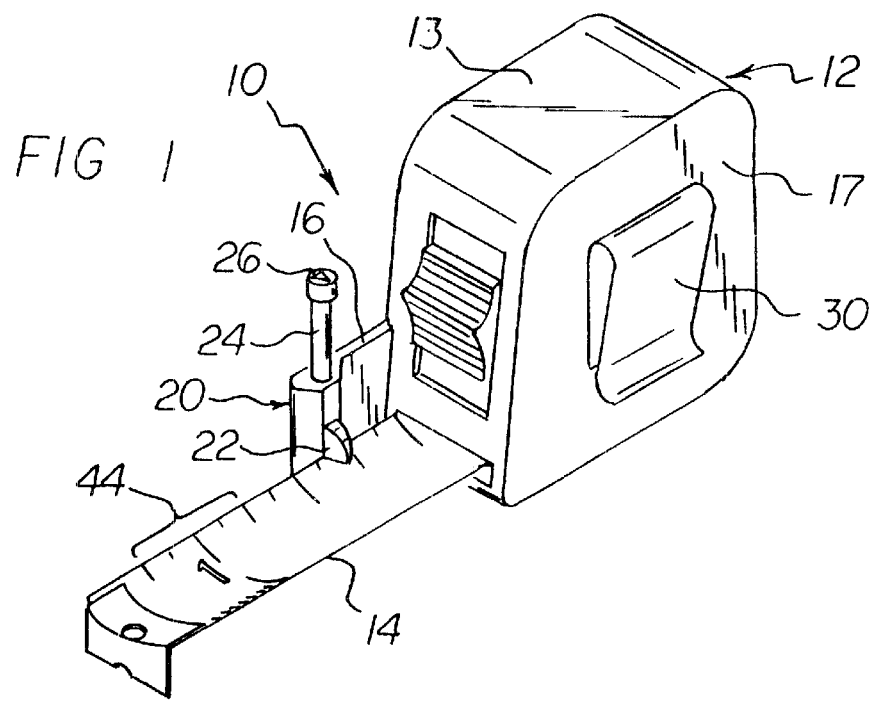
FIG. 1 is a perspective view showing a first embodiment of the tape measure and marking apparatus of the invention in which a marking apparatus is integrated into the fabrication of a tape measure apparatus.
Figure 2:
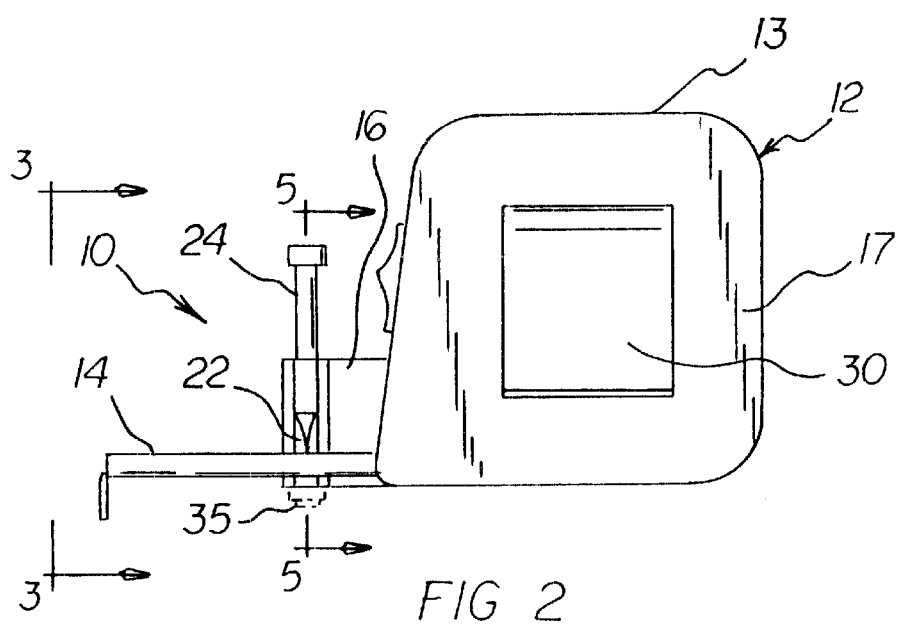
FIG. 2 is a side view of the embodiment of the tape measure and marking apparatus shown in FIG. 1.
Figure 3:
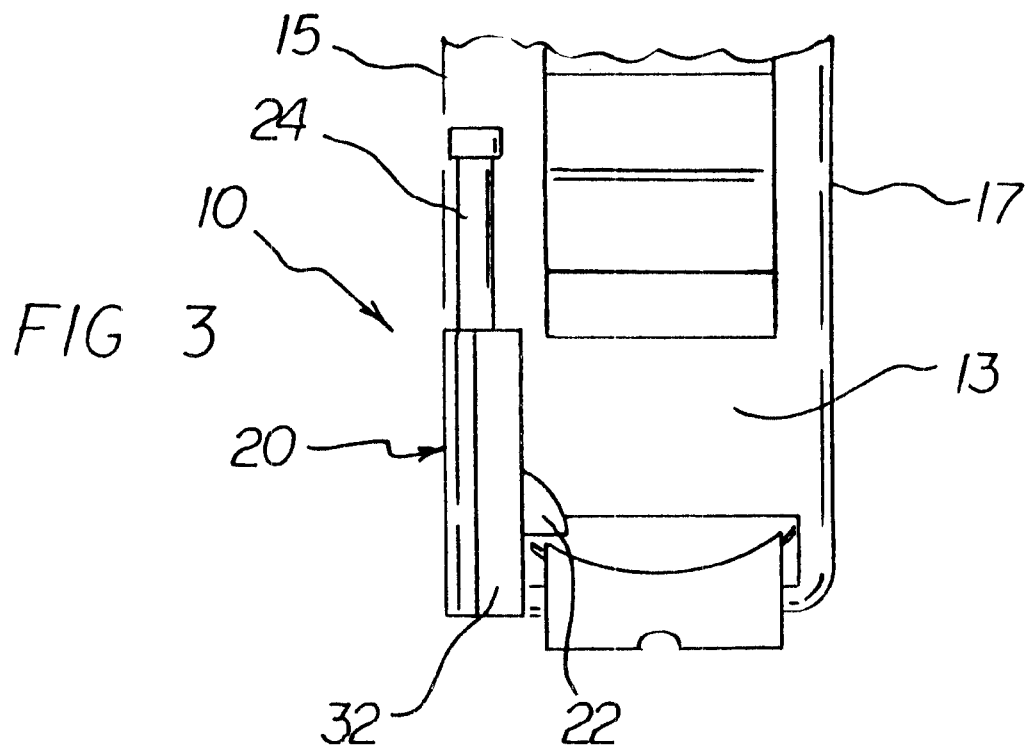
FIG. 3 is a front view of the embodiment of the tape measure and marking apparatus of FIG. 2 taken along line 3—3 thereof.
Figure 4:
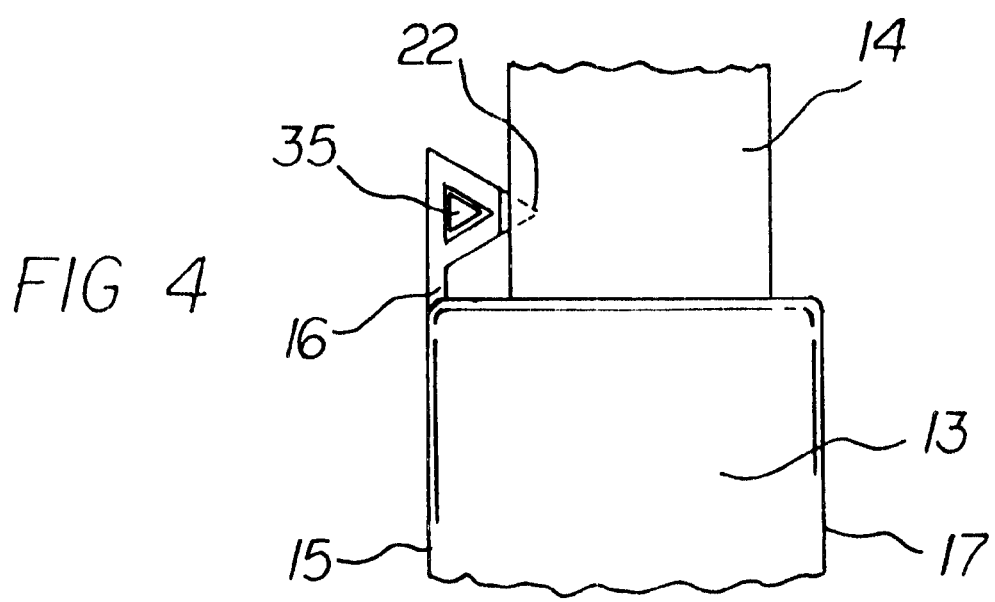
FIG. 4 is a partial bottom view of the embodiment of the invention shown in FIG. 1.

With reference to the drawings, a new and improved tape measure and marking apparatus embodying the principles and concepts of the present invention will be described.

Turning to FIGS. 1–7, there is shown a first embodiment of the tape measure and marking apparatus of the invention generally designated by reference numeral 10. In the first embodiment, tape measure and marking apparatus 10 is provided for use with a tape measure 12 that has a tape measure housing 13 from which measuring tape 14 exits in a tape dispensing direction. The details of tape measure 12 per se are well known and outside the scope of the present invention. Suffice it to say, any conventional retractable, coilable tape measure may be used with the present invention. The marking apparatus 10 includes a marker support member 16 attached to a first outer side 15 of the tape measure housing 13, and the marker support member 16 extends forward of the tape measure housing 13 in the tape dispensing direction. A retractable marker unit 20 is attached to the marker support member 16 at a location distal to the tape measure housing 13 in the tape dispensing direction. The retractable marker unit 20 is located beside the measuring tape 14 that is dispensed from the tape measure housing 13. A belt clip 30 can be attached to a second outer side 17 of the tape measure housing 13. A pointer member 22 is attached to the retractable marker unit 20 and extends over a portion of the measuring tape 14 that is dispensed from the tape measure housing 13.

More specifically, the retractable marker unit 20 includes a vertically extending plunger 24 which includes an alignment indicia 26 which is in alignment with the pointer member 22. The alignment indicia 26 is in a form of an alignment triangle 26 which has a triangle apex pointing in alignment with the pointer member 22. The retractable marker unit 20 includes a marker unit housing 32 which receives the plunger 24. A return spring 34 is received in the marker unit housing 32 and urges the plunger 24 towards a non-marking position. A marker element retainer 36 is attached to a distal end of the plunger 24, and a marker element 35 is attached to the marker element retainer 36. Preferably, the marker element 35 is an absorbent pad that contains a quantity of marking liquid, such as ink. Alternatively, the marker element 35 can be a relatively hard element that makes a marking impression in an article that is marked.

Preferably, the marker unit housing 32 has a generally trapezoidal cross-sectional shape whose non-parallel sides tend to converge towards the pointer member 22. The marker element 35 is in a form of a marker triangle 38 which has a triangle apex pointing in alignment with the pointer member 22 and the alignment triangle 26. Preferably, the marker element 35 is in a form of an ink pad. The ink pad contains a liquid ink.

Figure 9:
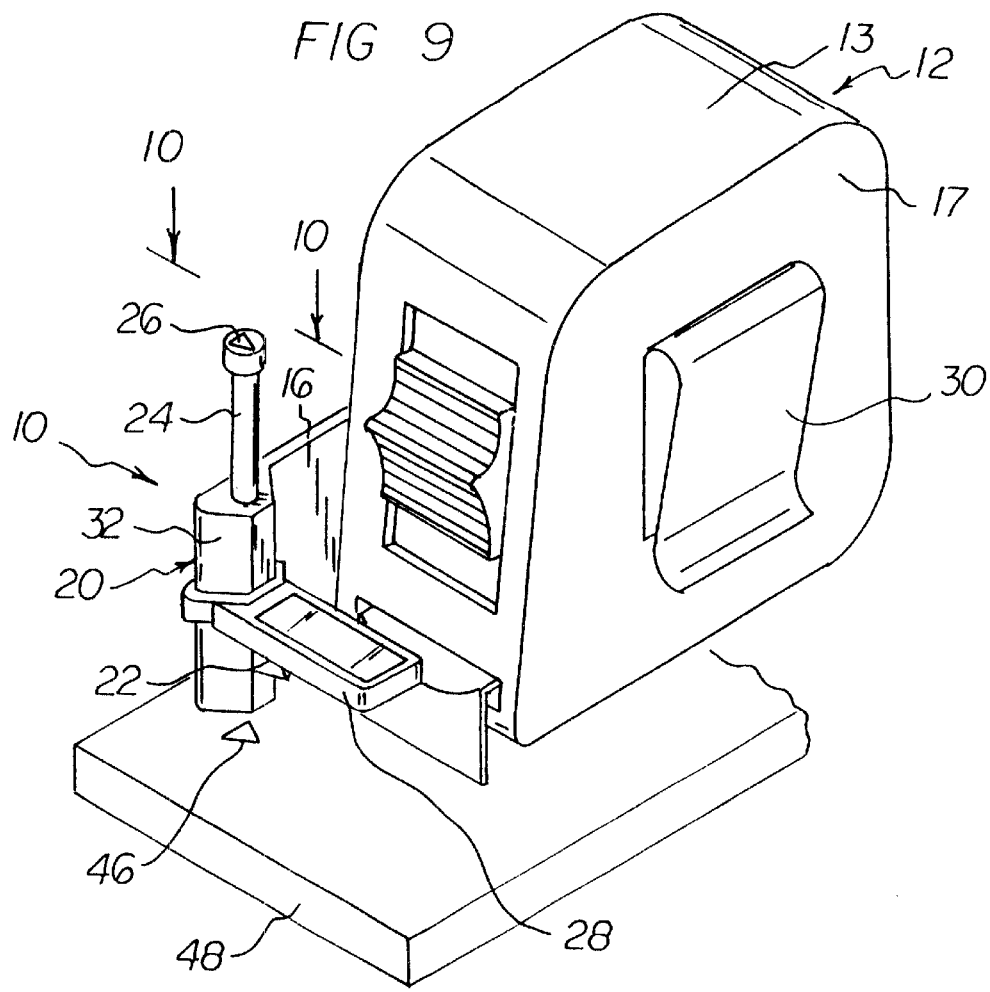
FIG. 9 is a perspective view of a third embodiment of the invention which includes a magnifier unit for magnifying indicia on a measuring tape.

To use the first embodiment of the invention, reference is made most specifically to FIG. 9 in which the marking apparatus 10, attached to a tape measure 12, is employed for placing a stamped mark 46 on an article, such as wooden board 48. As shown, the stamped mark preferably is in the form of an easily legible triangle with the apex of the triangle proximal to the edge of the measuring tape 14.

More specifically, the tape measure 12 is placed on the wooden board 48, and measuring tape 14 is pulled out from the tape measure housing 13 in the tape dispensing direction. A particular indicia of the tape measure indicia 44 is selected, such as for a particular length of wooden board 48 for cutting. The particular indicia is selected by placing the alignment triangle 26 on the plunger 24, the pointer member 22, and the particular indicia on the measuring tape 14 in alignment. Then, the plunger 24 is depressed, and the marker element 35 places a stamped mark 46 on the wooden board 48 which is also in alignment with the particular indicia on the measuring tape 14. As a result, the wooden board 48 is marked with the stamped mark 46 at the precise location desired.

Inside the retractable marker unit 20, when the plunger 24 is depressed, from the normal at-ready position, to make the stamped mark 46 on the wooden board 48, the return spring 34 is compressed within the bore or recess that accommodates the plunger by the downward movement of the plunger 24 that overcomes the resistance of the return spring 34. This position is indicated by the phantom outline of marker element 35 in FIG. 5. Once the stamped mark 46 has been made on the wooden board 48, the plunger 24 is released, and the return spring 34 returns the plunger 24 to the normally at-ready position.

Figure 5:
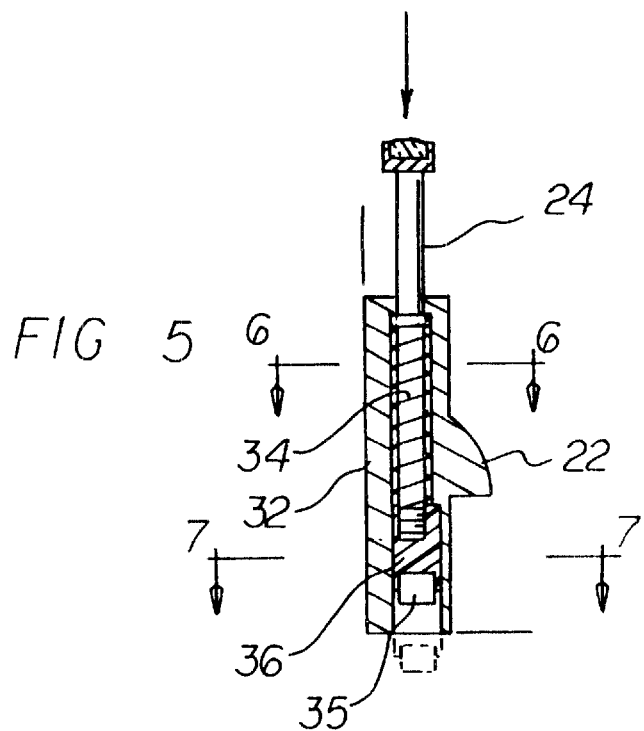
FIG. 5 is a cross-sectional view of the embodiment of the invention of FIG. 2 taken along line 5—5 thereof.

As shown in FIG. 7, the shape of the recess or bore portion 37 through which the retainer 36 travels is substantially triangular whereas as shown in FIG. 6, the shape of the recess or bore portion 39 through which the plunger 24 located above retainer 36 travels is cylindrical. Preferably, as depicted in FIG. 5, plunger 24 is suitably threadedly coupled to retainer 36 so the two parts travel between the at-ready and marking positions as a unitary element. As also shown in FIG. 5, the junction between the triangular shaped recess 37 and the cylindrically shaped recess 39 defines an abutment shoulder (not labeled) which serves as a stop limiting the upward travel of plunger 24 in the at-ready position under the influence of spring 34.

Figure 8:
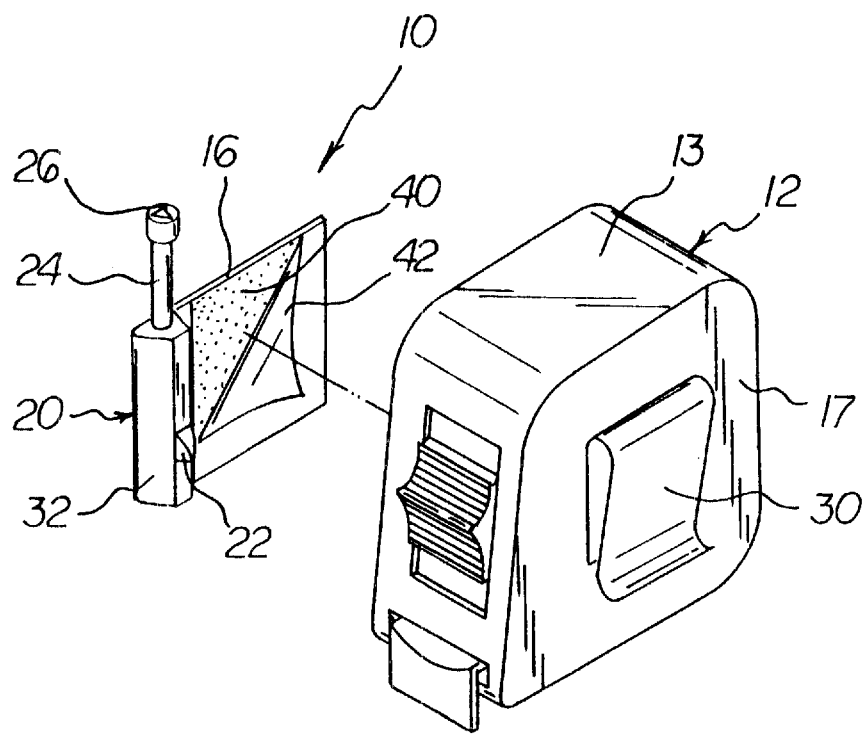
FIG. 8 is an exploded perspective view of a second embodiment of the invention in which a marking apparatus is retrofitted to a conventional tape measure.

Turning to FIG. 8, a second embodiment of the invention is shown. Reference numerals are shown that correspond to like reference numerals that designate like elements shown in the other figures. In addition, an adhesive surface 40 is formed on a tape-measure-facing side of the marker support member 16. A release sheet 42 is provided for covering the adhesive surface 40 prior to adhering the adhesive surface 40 to the first outer side 15 of the tape measure housing. This embodiment of the invention is used for retrofitting a conventional tape measure 12 to a tape measure and marking apparatus of the invention. More specifically, the release sheet 42 is pulled off of the adhesive surface 40, and the adhesive surface 40 is pressed up against the first outer side 15 of the tape measure housing 13. This is done so that the retractable marker unit 20 is distal to the tape measure 12 and to the side of the measuring tape 14 as it is dispensed from the tape measure 12 in the tape dispensing direction. Once this embodiment of the marking apparatus 10 is installed on the tape measure 12, the combined tape measure and marking apparatus of the invention can be used as described above.

Figure 10:
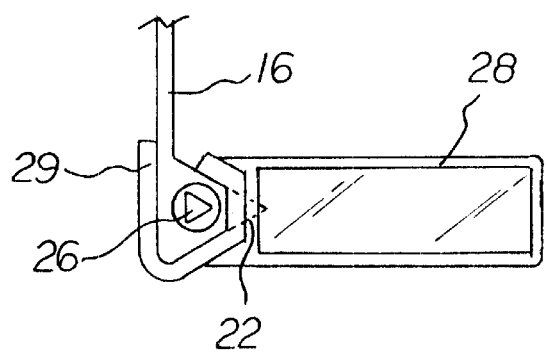
FIG. 10 is a partial top view of the embodiment of the invention shown in FIG. 9 taken along line 10—10 thereof.

Turning to FIGS. 9 and 10, a third embodiment of the invention is shown. Reference numerals are shown that correspond to like reference numerals that designate like elements shown in the other figures. In addition, a magnifier unit 28 is attached to the retractable marker unit 20 and extending transversely across the tape measure 12 that is dispensed from the tape measure housing 13. The magnifier unit 28 is attached to the retractable marker unit 20 with a spring clip portion 29. The magnifier unit 28 is attached to the retractable marker unit 20 at a location above the pointer member 22. In this way, both the pointer member 22 and the tape measure indicia 44 are visible in the field of view of the magnifier unit 28.

This embodiment of the invention is used in substantially the same way as the other embodiments of the invention described above. Additionally, the magnifier unit 28 permits a user to magnify and align both the particular selected indicia of the tape measure indicia 44 and the pointer member 22 prior to depressing the plunger 24 and applying the marker element 35 to a wooden board 48. If desired, the magnifier unit 28 can be readily removed from the marker unit housing 32 by pulling the magnifier unit 28 against the resistance of the spring clip portion 29.

In accordance with still yet another or fourth preferred embodiment of the present invention, it may sometimes be desirable to use the marker element 35 to emplace enhanced indicia on a work surface other than a triangular shaped symbol 46 (FIG. 9). For example, in some applications, it may be advantageous to anchor the measuring tape end after a length of tape is withdrawn form the housing, hold the plunger in the down or operative imprinting position, move the housing laterally and in so doing scribe an arc on a work surface having a radius equal to the withdrawn tape portion. To facilitate such use, and provide optional choices of enhanced marking capable of being obtained only with the present invention, an alternatively preferred marker apparatus incorporating a somewhat different arrangement of plunger and marker retainer element is illustrated in FIGS. 11 and 12.

More specifically, with reference now to FIGS. 11 and 12, modified plunger 24' has a distal extension 60 co-axially attached to externally threaded portion 62. Suitably supported on the extremity of distal extension 60 is an ink pen 64 such as, for example, a conventional felt-tip marker the construction of which is well known in the art. Marker element retainer 36' is axially and rotatably attachable to the threaded portion 62 of plunger 24' by means of an upstanding cylindrical shank portion 66 having a central recess 68. Shank portion 66 has an upper portion 70 that is internally threaded in complimentary fashion relative to external threaded plunger portion 62. Central recess 68 extends completely through marker retainer 36' and marker element 35' to provide a through opening sized sufficiently to slidingly receive therein plunger extension 60 and felt tip pen 64 when upper shank portion 66 of the retainer 36' is threadedly coupled to portion 62 of plunger 24' and is axially adjustable therewith.

It will be appreciated that the alternatively preferred axially adjustable plunger and marker retainer construction of FIGS. 11 and 12 may be substituted for the corresponding unit shown in FIG. 5, i.e. the axially adjustable plunger and marker unit of the former are employed with the above-described retractable marker unit 20 which includes marker unit housing 32 and which in modified form receives plunger 24', marker retainer 36' and marker element 35'.

With this alternative preferred form of the invention, either the triangular marker 35' or the felt tip pen 64 may be selected for use by suitably rotating the retainer 36' on threaded portion 62 to adjust the relative axial position of these parts. In this manner, a first condition may be selected where the felt tip pen protrudes through the opening at the bottom recess 68 as viewed in FIG. 11; or a second condition may be selected where the felt tip pen is axially withdrawn into the interior of the retainer 36'. In the first condition, the felt tip pen will be the marking instrument whereas in the second condition, the triangular shaped marker 35' will be the marking instrument. Relative axial adjustment of axial plunger portion 62 and retainer 36' suitable to select either the first condition or the second condition, respectively, may be accomplished merely by rotating plunger 24' relative to housing 32 because the triangular shape of retainer 36' functions as a key in recess 37 to prevent rotation of the retainer therein all of the while allowing axial translation thereof. In other words, because retainer 36' is restrained from rotating in recess 37 by reason of its triangular shape, the retainer will travel up or down in recess 37 depending upon the extent of relative axial rotation of plunger 24' and retainer 36'. Hence, selective rotation of these parts will be effective to locate the writing point of felt-tip pen 64 either below, above or in the plane of the bottom end surface (printing surface) of triangular shaped marker element 35' as desired.

In this regard, it is to be noted that a third condition may also be selected wherein the printing surface of marker element 35', and the point of the felt-tip pen 64 are substantially co-planar (i.e. adjusted to be at about the same elevation) with respect to the plane of the printing surface of marker element 35') in which case, the enhanced printed symbol will consist of a triangle with a central circle therein and a dot inside the central circle.

To facilitate anchoring the measuring tape end after a length of tape is withdrawn from the tape measure housing, holding the plunger in the down or operative imprinting position, and moving the housing laterally to imprint or scribe an arc on a work surface having a radius equal to the withdrawn tape portion as schematically shown in FIG. 15, the end tab 71 can be used. Turning to FIGS. 13 and 14, tape measure end tab 71 is secured to the distal end portion of measuring tape 14 by a series of rivets or like fasteners 82. In the mostly preferred arrangement shown, four such rivets 82 are substantially symmetrically disposed in a rectangular pattern to provide a high-strength joinder of the tab to the tape end portion. Tab 71 extends beyond the distal edge of tape 14 and terminates in an orthogonally directed downwardly depending end skirt 72 having an oblong shaped slot 78 therein. The distal edge portion of tab 71 extends beyond the distal edge of tape 14 a predetermined distance to provide room for a similar oblong shaped slot 74 having a central enlarged arcuate or circular opening 76 therein substantially as illustrated in FIG. 13. Slot 74 thus parallels and is closely juxtaposed to the distal end edge of tape 14. The bottom edge of skirt 72 is scalloped to provide a multiplicity of sharp edges suitable for gripping attachment to a work surface.

In use, a nail, pin or the like, represented by reference sign 84 in FIG. 15, may be inserted through central opening 76 and into work surface 48 to anchor the tab 71 and thus the end of tape 14 in the work surface. At a selected radial distance from nail 84, determined by a selected portion of the tape 14 being withdrawn from the tape measure housing 13, the marker apparatus according to the invention may then be used to imprint or scribe a corresponding arc on the work surface.

It will be appreciated that the slot 78 provided in the skirt portion 72 may be used alternatively to anchor the tab 71 (and end of tape 14) to an edge of a board or the like extending orthogonally with respect to work surface 48. Slots 74 and 78 are oblong shaped to permit linear markings to be place on a work surface as by using a pencil, razor blade, or the like.

In one optional mode of operation, after the relative location of the writing tip of felt-tip pen 64 is suitably adjusted relative to the printing surface of marker element 35' (by relative rotation of plunger 24' with respect to marker retainer 36'), the plunger 24' is depressed, and the marker element 35' or the felt-tip pen 64 protruding therefrom places a stamped mark on work surface 48. The plunger will then be returned to its at ready position by the action of spring 34.

In another optional mode of operation, continued relative rotation of plunger 24' with respect to marker retainer 36' will cause the spring 35 to compress until the top surface of the retainer 36' abuts against the shoulder located at the top end of recess 37 (see also FIG. 5). This, in turn, will cause the felt-tip pen 64 to remain in a printing position below the bottom surface of marker element 35' without the need to depress the plunger 24'. In this other mode of operation, movement of the housing 13 will cause the felt-tip pen 64 to scribe an arc as depicted schematically in FIG. 15 without need to maintain any downward force on the plunger 24' during such movement.

Various other advantageous modes of usage and operation of the instant invention will be apparent from the above disclosure, and accordingly, no further discussion relative to these other modes of usage and operation need be provided.

The components of the tape measure and marking apparatus of the invention can be made from inexpensive and durable metal and plastic materials.

It is apparent from the above that the present invention accomplishes all of the objects set forth by providing a new and improved tape measure and marking apparatus that is low in cost, relatively simple in design and operation, and which may advantageously be used to make a mark that is more expansive than a point. With the invention, a tape measure and marking apparatus is provided which places a mark to the side of the tape, wherein the mark is more expansive than a point. With the invention, a tape measure and marking apparatus provides a pointer that points from a marker portion of the apparatus to a tape measure portion of the apparatus. With the invention, a tape measure and marking apparatus is provided which provides all of the following be in clear alignment: a pointer; a position on the tape measure that is pointed to; and a mark that is made on the article. With the invention, a tape measure and marking apparatus is provided which makes a mark wherein the mark itself points to aligned indicia on a tape measure. With the invention, a tape measure and marking apparatus is provided which has a retractable marking element that automatically retracts once a desired mark has been made on an article. With the invention, a tape measure and marking apparatus is provided which can be retrofitted to a conventional tape measure to provide a combination tape measure and marking apparatus. With the invention, a tape measure and marking apparatus is provided which can be provided with a magnifier which provides magnification of a pointer and indicia on the tape measure. With the invention, a tape measure and marking apparatus is provided which stamps a mark upon an article to be marked. With the invention, a tape measure and marking apparatus is provided which provides a selectable option of type of enhanced marking to be used and the corresponding manner of operation thereof. With the invention, a tape measure and marking apparatus is provided having a unique end tab which facilitates the marking of scribed arcs by permitting the anchoring of the end of the measuring tape on a work surface such that the tape measure housing may be moved simultaneously upon actuation of the marking apparatus thereof.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. For example, in lieu of a stamped mark 46 in the form of an easily legible triangle with the apex of the triangle proximal to the edge of the measuring tape, any one of a wide variety other distinctive geometric or symbol shapes visually guiding the eye of the user to the edge of the measuring tape may be used instead.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A marking apparatus for use with a tape measure that has a tape measure housing from which measuring tape exits in a tape dispensing direction, comprising:
    a marker support member adapted to be attached to a first outer side of the tape measure housing, wherein said marker support member extends forward of the tape measure housing in the tape dispensing direction, and
    a retractable marker unit attached to said marker support member at a location distal to said tape measure housing, in the tape dispensing direction, wherein said retractable marker unit is juxtaposed with respect to the measuring tape that is dispensed from the tape measure housing,
    said retractable marker unit further including an axially extending plunger, a marker unit housing which receives said plunger, a return spring received in said marker unit housing and urging said plunger towards a non-marking position, a marker element retainer coupled to a distal end of said plunger, and a marker element attached to said marker element retainer,
    said plunger having a first cross-sectional shape, said marker retainer having a second cross-sectional shape different from said plunger first cross-sectional shape, and
    wherein said marker unit housing has a through bore for receiving said plunger therein, said through bore having a first axial portion having substantially the same cross-sectional shape as said plunger and said through bore having a second axial portion having substantially the same cross-sectional shape as said marker element retainer.

2. The apparatus of claim 1 wherein said marker element has substantially the same cross-sectional shape as said marker element retainer.

3. The apparatus of claim 1 wherein said first cross-sectional shape is circular and said second cross sectional shape triangular.

4. The apparatus of claim 1 wherein said marker element retainer is rotatably and axially coupled to said plunger wherein said marker retainer member is axially movably adjustable relative to said plunger within-said through bore second axial portion upon relative rotation of said plunger and said marker element retainer.

5. The apparatus of claim 4 wherein said marker element retainer has a through bore axially aligned with said plunger, said plunger has a marking member distally attached thereto, and said marking member extends through said marker element retainer axially aligned through bore when said marker element retainer is coupled to said plunger as aforesaid.

6. The apparatus of claim 5 wherein said marker element attached to said marker element retainer has an opening axially aligned with said axially aligned marker element retainer through bore wherein said marking member is adapted to extend through said marker element opening when said marker element retainer is coupled to said plunger as aforesaid.

7. The apparatus of claim 4 wherein said plunger has an externally threaded axial portion, said marker element retainer has an internally threaded axial portion, and said marker element retainer internally threaded portion is threadedly engaged on said plunger externally threaded portion.

8. The apparatus of claim 7 wherein said marker element retainer has a through bore axially aligned with said internally threaded portion, said plunger has a marking member distally attached to said externally threaded axial portion, and said marking member extends through said marker element retainer axially aligned through bore when said marker element retainer is threadedly engaged on said plunger externally threaded portion.

9. The apparatus of claim 1 wherein said tape measure is adapted to be withdrawn from said tape measure housing and said tape measure has a distal end portion, a tape end tab attached to the distal end portion of said tape measure, said tape end tab having an orthogonally extending skirt portion, said skirt portion being axially spaced from the end edge of said tape a predetermined distance, said end tap having an opening in therein located between said orthogonally extending skirt portion and said tape end edge for receiving therethrough a work surface attachment member.

10. The apparatus of claim 9 wherein said opening in said tape end tab is oblong shaped.

11. The apparatus of claim 10 further including an enlarged circular opening substantially centrally of said oblong-shaped opening.

* * * * *